United States Patent Office 3,613,459
Patented Oct. 19, 1971

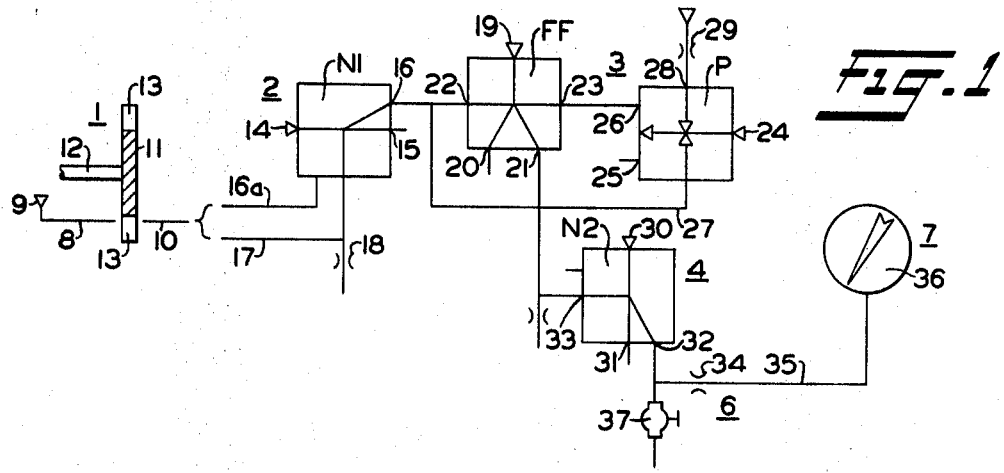
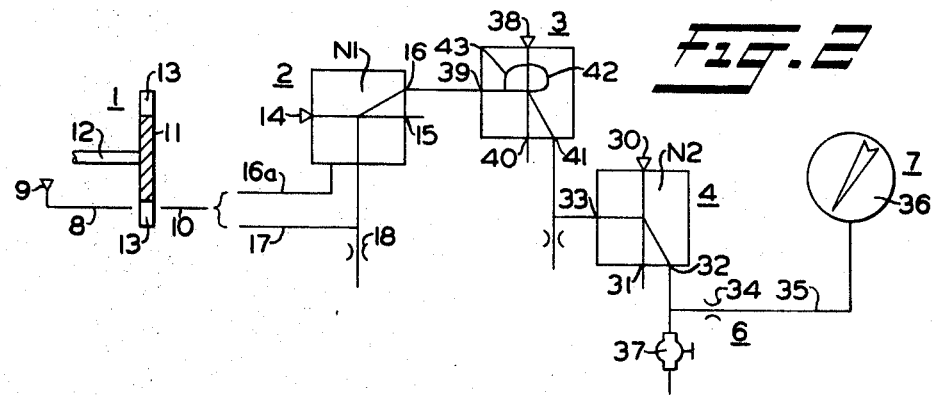
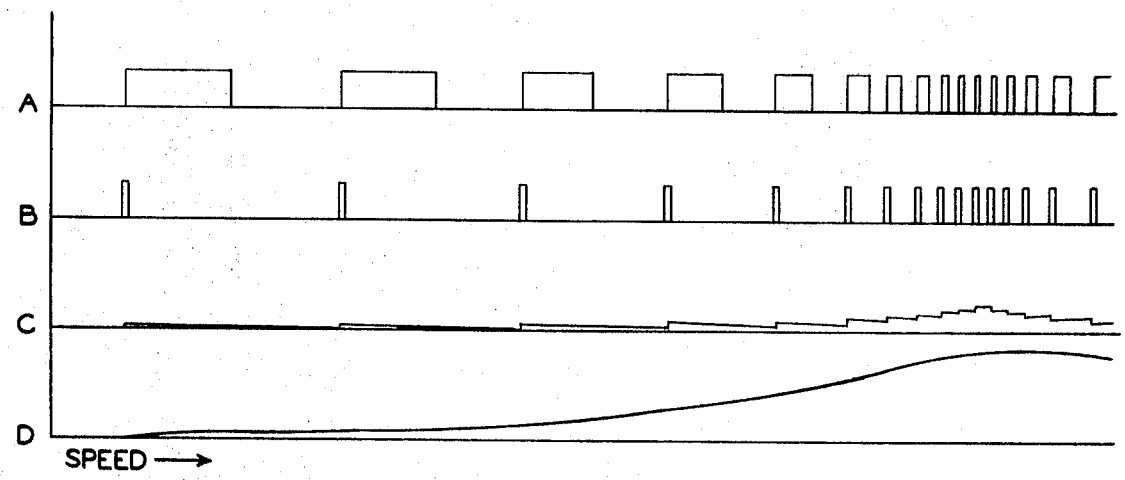

3,613,459
FLUIDIC SPEEDOMETER
Ronald A. Sarbach, Columbus, Ohio, assignor to Westinghouse Air Brake Company, Wilmerding, Pa.
Filed June 3, 1968, Ser. No. 734,073
Int. Cl. G01p 3/26
U.S. Cl. 73—506
5 Claims

ABSTRACT OF THE DISCLOSURE

A fluidic speedometer in which a pulse generator produces fluid pressure input pulses in square wave form varying in frequency in accordance with the speed of a given member, which pulses are reinforced and differentiated by interconnected pure fluid devices to produce pulses of short uniform duration corresponding to the frequency of the pulses produced by the pulse generator, which short duration pulses of uniform length are integrated by a choke means and a volume to provide to a gauge an analog pressure having an amplitude proportional to the frequency of the square wave input pulses initiated at the pulse generator.

BACKGROUND OF THE INVENTION

Heretofore, speedometers have been constructed of bulky mechanical or electrical components inherently subject to failure due to wear of moving parts.

SUMMARY OF THE INVENTION

It is the object of the present invention to construct a speedometer of pure fluid devices and relatively few moving parts to provide a compact durable mechanism.

In the present invention, this object is achieved by providing a pulse generator for producing fluid pressure pulses in square wave form at a frequency varying with the speed of a given member, such as a rotating shaft or a linearly movable strip, a pure fluid OR-NOR device to reinforce the square wave produced by the pulse generator, a pulse differentiating circuit comprised of a pure fluid device or devices responsive to each output pulse from the OR-NOR device to provide output pulses of predetermined short uniform duration, regardless of the length of the incoming pulse, a pulse integrating circuit comprised of choke means and a predetermined volume vented to atmosphere by an adjustable choke, and a gauge calibrated to readout the volume pressure in miles per hour.

This and other objects will become more readily apparent in the following description, taken with the drawing, in which:

FIG. 1 is a schematic view of a fluidic speedometer showing a first embodiment of the invention;

FIG. 2 is a schematic view of a fluidic speedometer showing a second embodiment of the invention; and FIG. 3 is a graphical illustration of pressure conditions occurring at various points in the fluidic speedometer of FIGS. 1 and 2.

Referring now to FIG. 1 of the drawing, there is shown a fluidic speedometer comprising a pulse generator, generally indicated at 1, fluidic means generally indicated at 2 for squaring the pulses produced by the pulse generator, a pulse differentiating circuit generally indicated at 3 and comprised of fluidic means for shortening each squared pulse to a predetermined length, fluidic means generally indicated at 4 for squaring the pulses produced by the differentiating circuit, a pulse integrating circuit generally indicated at 6 for providing a pressure having an amplitude corresponding to the frequency of the pulses produced by the fluidic pulse squaring means 4, and pressure read-out means 7 for reading out the pressure of the integrating circuit.

The aforementioned pulse generator 1 generates square pressure waves having a frequency varying as a direct function of speed, and comprises an emitter tube 8 connected to a pressure source 9, a collector tube 10 axially spaced from the emitter 2, and an interrupter disc 11 coaxially disposed on a shaft 12, the rotational speed of which shaft is to be measured. The interrupter disc 11 includes a plurality of radially extending openings or notches 13 of equal size and spaced uniformly along the full periphery of the disc to provide alternate lands and notches which, upon axial rotation of shaft 12, respectively interrupt and transmit fluid flow from the emitter to the collector, thus producing at the collector a square wave having a frequency varying directly with the speed of rotation of the shaft 12, and having a pulse width varying inversely with the speed of rotation of shaft 12.

The aforementioned wave squaring device 2 is provided to reinforce or resquare the wave at the output of the emitter tube 10, such reinforcement being required in the event a particular installation of the speedometer requires utilization of an emitter tube of several feet in length causing degrading of the square wave by passage through the emitter. The wave squaring circuit 2 produces a square wave duplicating that at the collector input, and comprises a conventional fluidic OR-NOR gate N1 having a supply input 14, a NOR output 15, an OR output 16, and a pair of control inputs 16a, 17, either of which inputs, when pressurized by the emitter 10, will depressurize the NOR output 15 and pressurize the OR output 16.

The aforementioned two inputs 16a and 17 of OR-NOR device N1 are provided to facilitate some degree of dynamic impedance matching with the signal wave incoming to the OR-NOR device N1 from the pulse generator 1 to obtain the best operating characteristics of the OR-NOR device N1. Specifically, if the total tubing volume utilized to interconnect the pulse generator 1 with input 16a is of such magnitude as to degrade the square wave so that the maximum pressure differential of the degraded square wave is insufficient to effect positive and consistent switching of OR-NOR gate N1, input 16a may be plugged, in any suitable manner, and input 17 may be utilized in place of input 16a. Input 17 is vented by way of impedance matching bleed choke 18 to provide a sharper drop in pressure in input 17 each time a land on disc 11 interrupts the fluid flow between the emitter 8 and elector 10.

The aforementioned pulse differentiator or one-shot circuit 3 provides an output pulse of predetermined width upon detection of each positive-going pulse at the output of the above-described squaring circuit 2, and comprises a conventional fluidic FLIP-FLOP device FF interconnected with a conventional fluidic PROPORTIONAL AMPLIFIER device P.

FLIP-FLOP device FF includes a supply port 19, a pair of output ports 20, 21, a first control input 22 connected to output 16 of previously described OR-NOR gate N1, and a second control input 23. The FLIP-FLOP device FF operates in a conventional manner to pressurize either output 20 or 21 dependent upon which of the control inputs 23, 22, respectively, is provided with a predetermined preponderance of pressure over the other, which pressurized output remains in the pressurized condition, even though both inputs are depressurized, until the other input is provided with a preponderance of pressure over the one input, thus switching the device to pressurize the other output.

The aforementioned PROPORTIONAL AMPLIFIER device P includes a supply port 24, a pair of outputs 25 and 26, the latter output connected to input 23 of the above-described FLIP-FLOP device FF, a control input 27 connected to output 16 of abovedescribed OR-NOR device N1, and a control input 28 connected to supply via a fluid resistor or choke 29. This device operates in a conventional fashion to proportionally divide output pressure between outputs 25 and 26 in accordance with the pressure differential between the control inputs 27 and 28.

The length of the tubing interconnecting output 16 of device N1 with port 27 of device P, and interconnecting port 23 of device FF with output 26 of device P is adjusted in accordance with the operating characteristics of devices FF and P so that when a positive going pulse at input 22 switches device FF to one bistable condition to provide a pressure signal at output 21, device P will operate a predetermined time thereafter to pressurize input 23 to switch device FF to the other bistable condition depressurizing output 21, as hereinafter described in detail.

The above-described squaring circuit 4 comprises a fluidic OR-NOR gate device N2 identical to OR-NOR gate device N1, and comprises a supply port 30, a NOR output 31, an OR output 32, and a control input 33 connected to output 21 of device FF.

The above-described pulse integrating circuit 6 comprises a resistance-capacitance circuit including a damping choke or fluid resistor 34 connected to output 32 of device N2, and piping 35 having a certain volume or capacitance series-connected with damping choke 34. A read-out pressure gauge 36, preferably highly damped to provide smooth response over the contemplated pressure range, is connected to measure the pressure in the tubing volume 35, and may be calibrated, preferably, in miles per hour. A calibration resistor 37, comprising an adjustable choke, communicates the fluid pressure input side of the damping choke 34 and the output 32 of device N2 to atmosphere to provide a fine adjustment on the read-out gauge by adjusting the charging pressure thereto.

In now describing the operation of the fluidic speedometer of FIG. 1, it will be assumed that shaft 12 is rotating at a speed to be measured. Since disc 11 rotates with the shaft, the notches 13 will interrupt the fluid jet stream to collector 10 from emitter 8 at a frequency corresponding to the speed of the shaft, thereby providing at collector 10 and the selected one of inputs 16a, 17 of fluidic device N1 a square wave comprised of a series of positive fluid pressure pulses having a frequency and pulse width or length dependent upon the rotational speed of the shaft 12, as illustrated by line A on the graph of FIG. 3.

In response to each positive pulse at the selected one of inputs 16a or 17, fluidic device N1 switches pressure from its output 15 to output 16, and at the termination of the input pulse automatically switches to its initial condition in which pressure in output 16 is pressurized and output 15 is pressurized, thereby reproducing at output 16 the square wave originating at the collector 10.

In the fluidic pulse differentiator circuit, each pulse occurring at output 16 of device N1 is utilized to pressurize input 22 of fluidic device FF which switches pressure from its output 20 to output 21 thereby providing a fluid pressure signal to input 33 of wave squaring fluidic device N2. At the same time, each pulse from output 16 of device N1 pressurizes input 27 of fluidic device P after a predetermined time delay governed by the fluid volume of the piping interconnecting output 16 with input 27, to thereby override bias pressure to device P at input 28 and proportionally pressurize output 26, which, in turn, pressurizes the other input 23 of fluidic device FF in opposition to the aforementioned pressure at input 22 of device FF. Since proportional amplifier P provides a proportionally larger output pressure relative to a given supply than OR-NOR device N1, because of inherent characteristics of conventional devices of these types, fluid pressure at input 23 of fluidic device FF is overridingly greater than that of input 22 thereof, by an amount sufficient to switch fluidic device FF to the abovedescribed first condition in which output 20 is pressurized and output 21 is depressurized, thus terminating the pulse at output 21 to control input 33 of fluidic device N2. Upon termination of the output pulse at output 16 of device N1, the pressure terminates at control input 22 of device FF and control input 27 of device P, whereupon the now unopposed bias pressure at control input 28 of device P terminates pressure at output 26 of device P and input 23 of device FF. Since device FF has already switched to the condition described above, output 20 remains pressurized and output 21 remains depressurized.

From the foregoing, it is apparent that the pulse differentiating circuit provides, in response to each pressure rise at the beginning of a pulse at output 16 of device N1, an output pulse at output 21 of device FF, each output pulse at output 21 comprising a pulse having a constant width regardless of the width of the original pulse, as illustrated by line B in the graph of FIG. 3. Device N2 responds to the pulse at output 21 of device FF at input 33 to switch pressure from output port 31 to output port 32, and, upon the termination of each input pulse, automatically switches to its initial condition in which output 31 is pressurized and output 32 is depressurized, thereby reproducing the frequency of the square wave pulses originally occurring at interrupter 10, which reproduced pulses are of the same fixed length as determined by the differentiator circuit 6.

It is apparent that at output 32 of fluidic device N2 there is provided to the integrating circuit 6 a series of pulses of uniform duration and having a frequency equal to the frequency to the original square wave at collector 10. During the time that output 32 of device N2 is pressurized, the gauge 36 is charged through the damping choke means 34 and piping 35. Conversely, during the time output 32 of device N2 is depressurized, the gauge will attempt to discharge through damping choke means 34 and calibrating resistor 37, as illustrated by line C of the graph of FIG. 3. Initially, the gauge will discharge very slowly, losing only a fraction of its pressure, so that each succeeding pulse from device N2 adds pressure to volume 35 and gauge 36 until the pressure in the gauge is sufficiently high to effect a discharge rate equal to the charge rate. Increasing the pulse frequency raises the gauge pressure, and, conversely, decreasing the pulse frequency decreases the gauge pressure, as illustrated in line D of the graph of FIG. 3. Thus, the pressure reading on the gauge is proportional to pulse frequency and is, therefore, proportional to the rotational speed of the shaft 12.

Referring now to FIG. 2 of the drawing, there is shown a fluidic speedometer similar in structure to that shown in FIG. 1, corresponding parts having identical reference numerals.

The fluidic speedometer of FIG. 2 is identical in operation to that of the above-described fluidic speedometer of FIG. 1 and differs thereover structurally only in regard to the pulse differentiator 3, which, in FIG. 2, comprises an integrated fluidic one-shot device of a commercially available type having a supply 38, an input control port 39, an output port 40 normally pressurized in the absence of pressure at input 39, an output port 41 pressurized in response to the pressurization of input port 39, and a time-delay feed-back passage 42 joining input 39 at juncture 43.

When input 39 is pressurized to switch pressure from output 40 to output 41, feed-back channel 42 is also pressurized at juncture 43, and, after a predetermined time delay as governed by the length and volume of feed-back channel 42, the input signal is fed back to oppose itself to depressurize output 41 and pressurize output 40, thus terminating the output pulse at output 41 to pulse squaring fluidic device N2. Upon termination of the input pulse at input 39, output 40 remains pressurized and output 41 remains depressurized.

Thus, the integrated one-shot device serves as a direct substitute for the pulse differentiating circuit 3 of FIG. 1, in that it responds to the positive going pulses at output 16 of fluidic device N1 to provide to pulse squaring fluidic device N2 pulses of uniform duration and at its same frequency as the pulses originating at its pulse generator.

The fluidic speedometers of FIG. 1 and FIG. 2 may be adjusted to read in specific speed ranges by adjusting the number of interruptions per revolution of the interrupter disc 11, as desired. For example, a number of different discs 11, each having a different number of notches around the periphery, may be provided for selective attachment to the shaft 12, as desired.

Having now described the invention, what I claim as new and desire to secure by Letters Patent is:

1. A fluidic speedometer, comprising:
   (a) means for producing first fluid pressure pulses in square wave form at a frequency which varies in accordance with the speed of a member;
   (b) pure fluid means responsive to said first fluid pressure pulses to produce second fluid pressure pulses of uniform duration and at the same frequency as said first fluid pressure pulses;
   (c) means for integrating said second fluid pressure pulses to provide a fluid pressure proportional to the frequency of said second fluid pressure pulses;
   (d) said first-mentioned means comprising:
      (i) an emitter for expelling fluid under pressure along a path;
      (ii) a collector spaced from said emitter on said path for receiving the fluid expelled from said emitter; and
      (iii) means attachable to said member for movement across said path and having a configuration for repeatedly interrupting flow of fluid to said collector at a frequency corresponding to the speed of said member; and
      (iv) a fluidic OR-NOR device having a pair of control inputs selectively connectable to the output of said collector, and having an OR output and a NOR output;
      (v) means for bleeding down one of said pair of control inputs between pulses when said one control input is connected to the output of said collector; and
      (vi) said OR output connected to operate said pure fluid means.

2. A fluidic speedometer, comprising:
   (a) means for producing first fluid pressure pulses in square wave form at a frequency which varies in accordance with the speed of a member;
   (b) pure fluid means responsive to said first fluid pressure pulses to produce second fluid pressure pulses of uniform duration and at the same frequency as said first fluid pressure pulses;
   (c) means for integrating said second fluid pressure pulses to provide a fluid pressure proportional to the frequency of said second fluid pressure pulses;
   (d) said pure fluid means including:
      (i) a fluidic FLIP-FLOP device switchable in response to each pressure rise at the start of each of said first fluid pressure pulses to provide an output fluid pressure comprising the start of one of said second fluid pressure pulses; and
      (ii) means including a fluidic PROPORTIONAL AMPLIFIER responsive to each said pressure rise to switch said fluidic FLIP-FLOP to terminate said output pressure a predetermined time after said fluidic FLIP-FLOP is switched to provide said output pressure.

3. A fluidic speedometer, as recited in claim 2, in which:
   (a) said fluidic FLIP-FLOP device includes a first control input pressurizable by said first fluid pressure pulses to switch said fluidic FLIP-FLOP to provide said output fluid pressure at an output, and a second control input pressurizable to switch said fluidic FLIP-FLOP to terminate said output fluid pressure at said output;
   (b) said PROPORTIONAL AMPLIFIER including a first control input pressurizable by each said pressure rise to pressurize an output connected to said second control input of said fluidic FLIP-FLOP device, and a second control input pressurizable to terminate pressure at said output; and
   (c) means providing a constant fluid biasing pressure at said second control input of said PROPORTIONAL AMPLIFIER, said fluid biasing pressure being less than that of said first fluid pressure pulses.

4. A fluidic speedometer, as recited in claim 2, in which said pure fluid means further comprises fluid means for squaring the pulses occurring at said output of said fluidic FLIP-FLOP device.

5. A fluidic speedometer, as recited in claim 4, in which said fluid means for squaring the pulses comprises a fluidic OR-NOR device having a control input pressurizable by said output of said fluid FLIP-FLOP device to pressurize its OR output connected to provide fluid pressure to said integrating means.

References Cited
UNITED STATES PATENTS

| | | | |
|---|---|---|---|
| 3,216,252 | 11/1965 | Chapman et al. | 73—506 UX |
| 3,392,739 | 7/1968 | Taplin et al. | 73—521 UX |
| 3,409,032 | 11/1968 | Boothe et al. | 73—521 UX |

JAMES J. GILL, Primary Examiner

U.S. Cl. X.R.

73—521; 137—81.5